No. 834,076. PATENTED OCT. 23, 1906.
B. N. PIERCE.
PITCH LOCK FOR REVERSIBLE PROPELLERS.
APPLICATION FILED OCT. 26, 1905.

2 SHEETS—SHEET 1.

WITNESSES:
W. M. Gentle.
N. Allemong

INVENTOR.
Burt Newlon Pierce
BY
W. H. Lockwood
ATTORNEY.

No. 834,076. PATENTED OCT. 23, 1906.
B. N. PIERCE.
PITCH LOCK FOR REVERSIBLE PROPELLERS.
APPLICATION FILED OCT. 26, 1905.

2 SHEETS—SHEET 2.

WITNESSES:
W. M. Gentle
N. Allemong

INVENTOR.
Burt Newlow Pierce,
BY
V. H. Lockwood
ATTORNEY.

UNITED STATES PATENT OFFICE.

BURT NEULON PIERCE, OF INDIANAPOLIS, INDIANA, ASSIGNOR OF ONE-HALF TO CARL G. FISHER, OF INDIANAPOLIS, INDIANA.

PITCH-LOCK FOR REVERSIBLE PROPELLERS.

No. 834,076.  Specification of Letters Patent.  Patented Oct. 23, 1906.

Application filed October 26, 1905. Serial No. 284,554.

*To all whom it may concern:*

Be it known that I, BURT NEULON PIERCE, of Indianapolis, county of Marion, and State of Indiana, have invented a certain new and useful Pitch-Lock for Reversible Propellers; and I do hereby declare that the following is a full, clear, and exact description thereof, reference being had to the accompanying drawings, in which like numerals refer to like parts.

The object of this invention is to provide an effective means for reducing the friction resulting from the end thrust of the sleeve or other means employed in launches and similar vessels for changing and maintaining the pitch of the propeller-blades. The device as herein shown has been used in connection with launches, and, so far as I am aware, in such vessels the end thrust of the sleeve, that controls the pitch of the propeller-blades, has been resisted by nothing more than an ordinary bearing. In such arrangement the sleeve for controlling the pitch of the propeller-blades is slidable on the propeller-shaft, and therefore is movable independently of it. Heretofore, so far as I am aware, this end thrust of said sleeve has been resisted only by the bearing used in connection with the means for changing the position of said sleeve and the pitch of the propeller.

The chief feature of the invention consists in providing means whereby the end thrust of this pitch-changing sleeve or pitch-lock may be transferred to the propeller-shaft. The result is that the bearing is relieved from friction and wear and does not become heated, whereas in the former constructions of which I am aware the efficiency of the device will be destroyed in a few minutes by the heat from the great friction and wear resulting from the end thrust of the pitch-lock of the propeller-blades. This trouble increases with an increase of horse-power in the motor.

The full nature of the invention will be understood from the accompanying drawings and the following description and claims.

Figure 1:
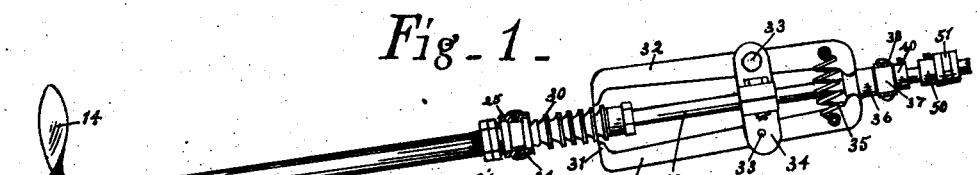
Figure 2:
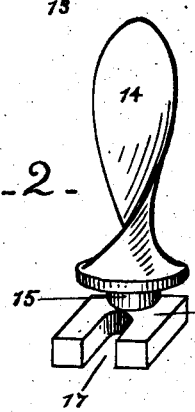
Figure 6:
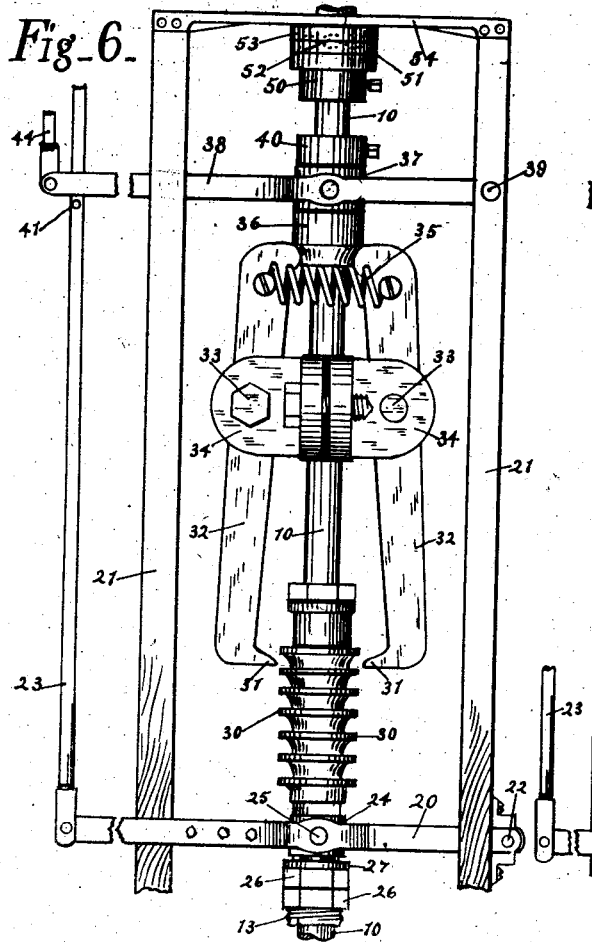
Figure 7:
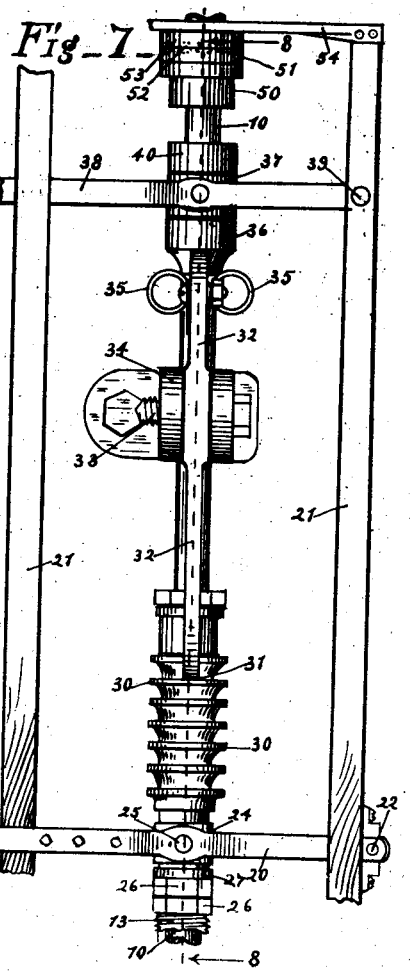
Figure 8:
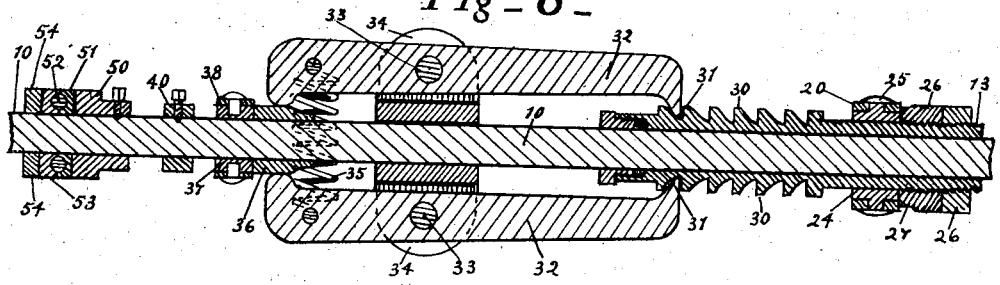

In the drawings, Figure 1 is a perspective view of a propeller and shaft with a portion of the pitch-changing means shown in connection therewith in full and a portion shown in vertical section longitudinally of the propeller-shaft, the pitch-lock, however, being in a position rest. Figs. 2, 3, 4, and 5 are detail views of the propeller, its mounting, and means near the propeller for changing the pitch of the blades. Fig. 6 is a plan view of the inner end of the propeller-shaft with the associated parts for maintaining and changing the pitch of the propeller-blades, parts being broken away and parts being shown in a position of rest. Fig. 7 is substantially the same view as Fig. 6 with my improved pitch-lock in a vertical instead of a horizontal position. Fig. 8 is a central vertical longitudinal section through the device as shown in Fig. 7, showing my improved pitch-lock in its operative position.

Figure 3:
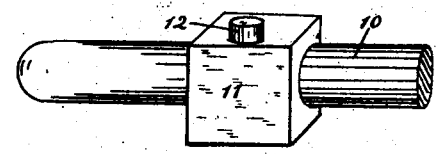
Figure 4:
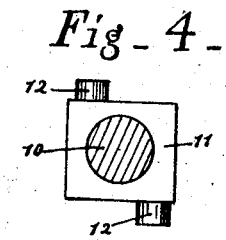
Figure 5:
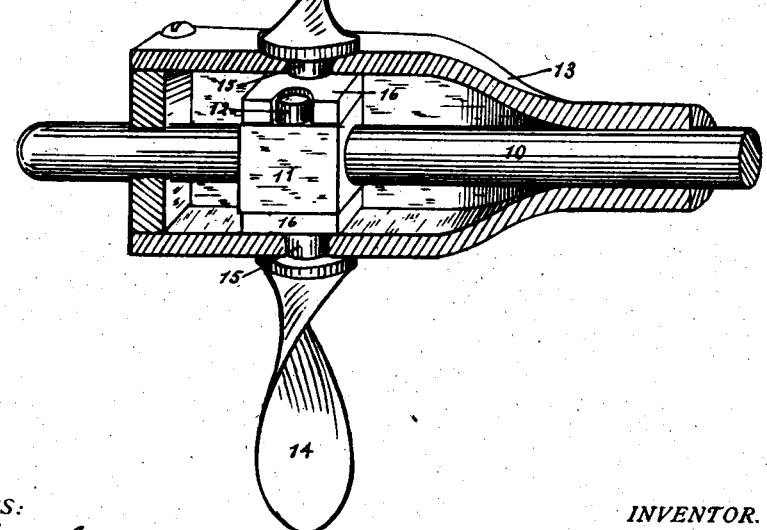

Referring now to the details of the drawings shown herein, 10 represents a propeller-shaft which carries and has secured to it rigidly a block 11, as seen in Figs. 3, 4, and 5, which carries oppositely-located bearing-pins 12, one on each side of the propeller-shaft. A sleeve 13 surrounds the propeller-shaft for some distance and near the propeller is enlarged to form a box, as shown in Fig. 5. This sleeve 13 is capable of longitudinal movement independently of the propeller-shaft, and the propeller-shaft is mounted in connection with the vessel so as to have no longitudinal movement whatever. In each side of the box end of the sleeve 13 there is a propeller-blade 14, having a bearing portion 15, that has bearing in the side of said box end, and a plate 16 is secured rigidly to the inner end of said bearing portion 15, with a vertical slot 17 in it. The bearings for the propeller-blades are on each side of the propeller-shaft and mounted so that the axis of said propeller-blades intersects the axis of the shaft and one plate 16 extends upwardly about the upper pin 12, while the other plate 16 extends downwardly about the lower pin 12. The result of this construction of propeller is that a slight longitudinal movement of the sleeve 13 will change the pitch of the propeller-blades so as to reverse the direction of movement of the vessel and make it go forward, backward, or neutral, as desired. Referring to Figs. 6 to 8, a lever 20 is shown pivoted to the frame 21 at 22 and actuated by a rod 23, connected with the same shifting means, for the purpose of giving to said sleeve 13 the longitudinal movement necessary to change the pitch of the propeller-blades. The lever 20, therefore, is provided with a bearing-box or shifting collar 24, surrounding said sleeve and pivotally mounted in the lever 20 by means of the pins 25, said lever 20 being yoked so as to extend above and below said bearing-box. Nuts 26 are placed on said sleeve on one side of said bearing-box 24, and a stationary shoulder 27, integral with the nuts 26, is on the other side of said bearing-box. The result is that longitudinal movement of the rod 23 will cause a corresponding movement of the sleeve 13. In constructions of the kind, so far as I am aware, this bearing-box 24 has heretofore had the function of resisting the end thrust of the sleeve 13, which is very great and in the course of a very short time will heat any box, and the faster the propeller is operated the greater its friction and thrust will be, and the greater the pitch of the blades the greater would be the thrust. The end thrust created by the pitch of the blades of the propeller in such prior construction is not transmitted to nor does it affect the propeller-shaft, but the whole effect of the same comes upon the bearing-box 24.

I have provided the inner end of the sleeve 13 with a series of stop projections or notches 30, (shown herein in annular form,) adapted to be engaged by the teeth 31 of the pawl-like levers or arms 32, fulcrumed at 33 in a pair of plates 34, clamped rigidly on the shaft 10. A spring 35 is connected with the two inner ends of said arms 32 and normally tends to withdraw the teeth 31 from engagement with the projections 30. The arms 32 are actuated in an opposite way to bring the teeth 31 thereon into engagement with the notches of the projections 30 by a sliding block 36, provided with an inclined annular face that tends to spread the inner ends of said arms 32 against the action of the spring 35 and to positively hold the teeth 31 of said arms in engagement with the projections 30. For this purpose said sliding block 36 is moved by a loose collar 37, surrounding the shaft 10 and pivotally connected with and between the upper and lower parts of the yoked lever 38. This lever is pivoted to the frame at 39 and is actuated at its opposite end by a rod 44, connected with some shifting means. The idle position of these parts is shown in Figs. 6 and 7, whereas the position during the forward propulsion of the vessel is shown in Fig. 8. A stationary stop-collar 40 is secured to the shaft 10 to limit the movement of the loose collar 37 during the release of the mechanism just described. It is therefore obvious that while the arms 32 are in engagement with the projections 30, as shown in Fig. 8, the end thrust of the pitch-changing sleeve 13 will be transmitted immediately and directly to the shaft 10 through the plates 34 and will leave the bearing-box 24 free from friction and practically idle, and this is the position of the parts during the forward movement of the vessel. During the rearward movement thereof the end thrust of the sleeve 13 by the blades is resisted by said bearing-box 24 acting against the shoulder 27. This will cause friction as heretofore; but since the backward movement of the vessel is of very short duration and seldom occurs the friction resulting is of no serious consequence, for it cannot cause heating of the parts. The thrust that is thus transmitted to the shaft is resisted by a ball-bearing. (Shown at the left-hand end of Fig. 8.) There a collar 50 is secured to the shaft with a facing 51, that has a ball-race for the balls 52, which run in the ball-race in the plate 53, that is secured from endwise movement by the frame 54. Hence with this construction there are no parts that will become heated by reason of the end thrust of the propeller, and hence there is no limit to the continued forward movement of the vessel due to the heating of the parts.

I have shown a number of annular projections or notches in the sleeve 30; but no particular form or number is necessary. It is better to have a plurality of them, however, so that there will be no difficulty in getting the teeth 31 to engage some projection. When the lever 38 is released, the spring 35 will release the arms 32 and leave the parts to operate in the manner heretofore common, and this is done only during the backward movement of the vessel or at the will of the operator.

The lever 38 is moved by a pin 41 on the rod 23 when the blades of the propeller are changed to a neutral backing condition. This is to cause the arms 32 to be disengaged from the projections 30 simultaneously with the change of pitch of the blades, and by operating a single means, for this must be done suddenly and without time to reverse both levers 23 and 38 separately. To this end the bearing-box 24 has enough play before it actuates the sleeve to permit the pin 41 to move the lever 38 and sliding block 36 far enough to cause the release of the ends of the arms 32 from the projections 30.

What I claim as my invention, and desire to secure by Letters Patent, is—

1. The combination with a reversible propeller for vessels, a propeller-shaft, means for preventing longitudinal movement of said shaft, and a sleeve longitudinally movable on said shaft for changing the pitch of the propeller-blades, of a pair of arms pivotally mounted between their ends on said shaft, one end of said arms adapted to engage and resist the thrust of said sleeve, a sliding tapering block mounted on said shaft in position to spread the opposite ends of said arms, and a lever for moving said sliding block.

2. The combination with a reversible propeller for vessels, a propeller-shaft, means for preventing longitudinal movement of said shaft, and a sleeve longitudinally movable on said shaft for changing the pitch of the propeller-blades, of a pair of arms pivotally mounted between their ends on said shaft, one end of said arms adapted to engage and resist the thrust of said sleeve, a sliding tapering block mounted on said shaft in position to spread the opposite ends of said arms, a lever for moving said sliding block, and a spring tending to spread the engaging ends of said arms.

3. The combination with a reversible propeller for vessels, a propeller-shaft, means for preventing longitudinal movement of said shaft, and a sleeve longitudinally movable on said shaft for changing the pitch of the propeller-blades, of a series of annular projections on the inner end of said sleeve, arms pivotally mounted on said shaft with teeth on one end thereof adapted to engage said projections on said sleeve, and means for moving said arms and holding them in engagement with the notched portion of said sleeve.

4. The combination with a reversible propeller for vessels, a propeller-shaft, means for preventing longitudinal movement of said shaft, and a sleeve longitudinally movable on said shaft for changing the pitch of the propeller-blades, of means for transmitting the thrust of the propeller-blades from the sleeve to said shaft, and a single means for moving said sleeve and releasing said thrust-transmitting means.

5. The combination with a reversible propeller for vessels, a propeller-shaft, means for preventing longitudinal movement of said shaft, and a sleeve longitudinally movable on said shaft for changing the pitch of the propeller-blades, of a pair of arms pivotally mounted in connection with said shaft and adapted at one end to engage and resist the thrust of said sleeve, a lever for moving and holding said arms in such engaging position, a lever for moving said sleeve, and a single means for actuating both levers in changing the blades of the propeller to a neutral or backing position.

In witness whereof I have hereunto affixed my signature in the presence of the witnesses herein named.

BURT NEULON PIERCE.

Witnesses:
H. B. McCORD,
N. ALLEMONG.